United States Patent [19]

Chernikhov et al.

[11] Patent Number: 4,458,041

[45] Date of Patent: Jul. 3, 1984

[54] HEAT-RESISTANT COMPOSITION

[76] Inventors: Alexei Y. Chernikhov, prospekt Vernadskogo, 93, kv. 64; Mikhail N. Yakolev, ulitsa Amurskaya, 8, kv. 93; Nikolai S. Rogov, ulitsa I. Babushkina, 18, kv. 39; Aleftina P. Petrova, ulitsa Flotskaya, 54, kv. 93, all of Moscow; Eduard B. Maitirosov, ulitsa Poperechnaya, 1, kv. 12, Moskovskaya ublast; posclok Malakhovka; Valentin E. Gul, ulitsa Chkalova, 52, kv. 13, Moscow, all of U.S.S.R.

[21] Appl. No.: 199,116

[22] Filed: Oct. 17, 1980

Related U.S. Application Data

[63] Continuation of Ser. No. 8,562, Feb. 1, 1979, abandoned.

[51] Int. Cl.³ .............................................. C08L 63/00
[52] U.S. Cl. .................................. 523/435; 523/439; 524/538; 524/542; 524/557; 524/558; 524/849; 524/850; 524/851; 524/858; 524/871; 524/873; 524/874; 524/876; 524/500
[58] Field of Search .............. 524/881, 871, 873, 874, 524/876, 500, 538, 542, 857, 858, 868, 869, 849, 850, 851; 523/439, 435

[56] References Cited

U.S. PATENT DOCUMENTS

| 3,657,186 | 4/1972 | Craven | 528/85 |
| 3,874,749 | 7/1972 | Craven | 528/68 |
| 4,159,262 | 6/1979 | Hsu | 528/126 |
| 4,229,560 | 10/1980 | Chernikhov et al. | 528/4 |

FOREIGN PATENT DOCUMENTS 2548194 5/1976 Fed. Rep. of Germany.
1487226 5/1967 France.

OTHER PUBLICATIONS

Simonds et al.; Handbook of Plastics; Van Nostrand Co. Inc.; 2nd Ed.; 1949; pp. 304–305.

Primary Examiner—Lewis T. Jacobs
Attorney, Agent, or Firm—Steinberg & Raskin

[57] ABSTRACT

A heat-resistant composition containing an organic or elemento-organic binder and a filler. As a binder the composition contains at least one compound of the formula:

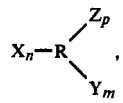

wherein R is an organic radical with a number of carbon atoms of from 2 to 1,000; a radical with a number of carbon atoms of from 2 to 1,000 containing 1 to 1,000 atoms of silicon and/or
1 to 1,000 atoms of fluorine, and/or
1 to 1,000 atoms of chlorine, and/or
1 to 1,000 atoms of bromine, and/or
1 to 1,000 atoms of nitrogen, and/or
1 to 1,000 atoms of sulphur, and/or
1 to 1,000 atoms of phosphorus, and/or
1 to 1,000 atoms of boron, and/or
1 to 1,000 atoms of oxygen,
X and Y are each $-NH_2$, $-OH$, $-SH$, $-NCO$, $-NSO$, $-NCS$, said X and Y may be the same or different; Z is $-C\equiv N$, $-C\equiv CH$ and is located in the same or different positions selected from alpha-, beta-, ortho- and peri- positions relative to X and Y; $n \geq 1$, $m \geq 1$, $p \geq 1$, the components being present in the following proportions, parts by weight:

| binder | 100 |
| filler | 0.1 to 10,000. |

7 Claims, No Drawings

HEAT-RESISTANT COMPOSITION

This is a continuation of application Ser. No. 008,562, filed Feb. 1, 1979, now abandoned.

The present invention relates to heat-resistant compositions.

FIELD OF THE INVENTION

Said compositions find an extensive use in various industries. Thus, these are useful in mechanical engineering, manufacture of instruments, electrical engineering and electronics, aircraft industry, manufacture of tools, space technology, nuclear industry.

On the basis of such compositions various materials are produced, namely: moulding materials, compounds, adhesives, glass-, carbon- and boron-plastics, foamed materials.

Principal requirements imposed by modern technology on such materials reside in that these materials should retain, for rather long periods, their physico-mechanical properties (bending strength, compression strength, tensile strength, shape-stability and the like) and dielectric properties (volume resistivity and surface resistivity, break-down voltage and the like) at temperatures of the order of 300° C. and above.

BACKGROUND OF THE INVENTION

Known in the art are a great number of materials on the basis of compositions incorporating heat-resistant heterocyclic polymers.

However, in the preparation of such materials use is made of only final polymers. The starting monomers cannot be directly employed for the production of said materials, since during polymerization thereof certain by-products are formed (such as $H_2O$, $CO_2$, $NH_3$) which result in substantially impaired properties of the final materials. For this reason, for the purpose of attaining the best properties of the materials, first effected is the process of preparation of a polymer involving stages of synthesis, recovery and purification of the polymer, followed by processing of the thus-prepared polymer to a corresponding material. Said additional stages (i.e. synthesis, recovery and purification of the polymer) substantially complicate the process of manufacture of the final materials and render their manufacture more expensive; it is also necessary to have additional production areas. The process of treatment of the final heterocyclic polymers is accompanied by certain difficulties. While ensuring a high thermal and thermooxidative stability of polymeric chains, the aromatic nature of these polymers at the same time defines strong intermolecular effects. For this reason, in the case of heat-resistant heterocyclic polymers softening temperatures and, hence, temperatures of processing said polymers to final articles frequently approach destruction temperatures, i.e. within the range of from 350° to 400° C. At the same time, said difficulties may be overcome by the use of the starting reagents which react without liberation of any by-products. This enables elimination of said stages of synthesis, recovery and purification of polymers as separate technological processes, since the formation of a polymeric structure may occur simultaneously with the process of manufacture of the final material. Since the starting reagents feature a higher mobility than macromolecules based thereon and taking into account the fact that the process of formation of a heterocyclic polymeric structure is substantially completed at temperatures of less than 300° C., the process of manufacture of the final articles in this case may be also performed at temperatures of below 300° C. Reagents possessing such properties are bis-ortho-aminonitriles and bis-ortho-hydroxynitriles which, upon reaction with polyfunctional isocyanates, form heat-resistant polymers of a heterocyclic structure corresponding to the formulae:

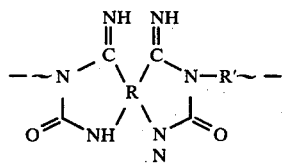

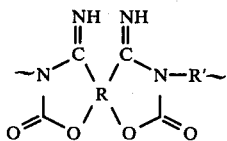

respectively, wherein R is selected from the group consisting of:

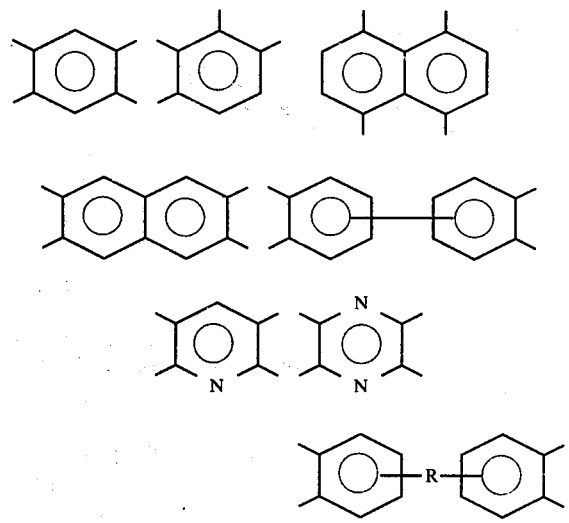

wherein $R^2$ is selected from the group consisting of an alkylene radical containing 1 to 4 carbon atoms.

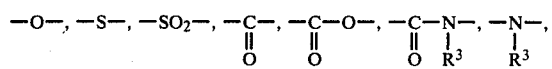

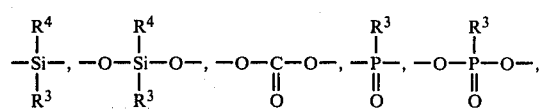

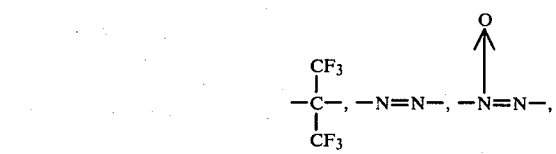

wherein $R^3$ and $R^4$ are selected from the group involving an alkyl radical containing 1 to 3 carbon atoms and an aryl radical; R' is selected from the group consisting of an alkylene radical containing 2 to 40 carbon atoms,

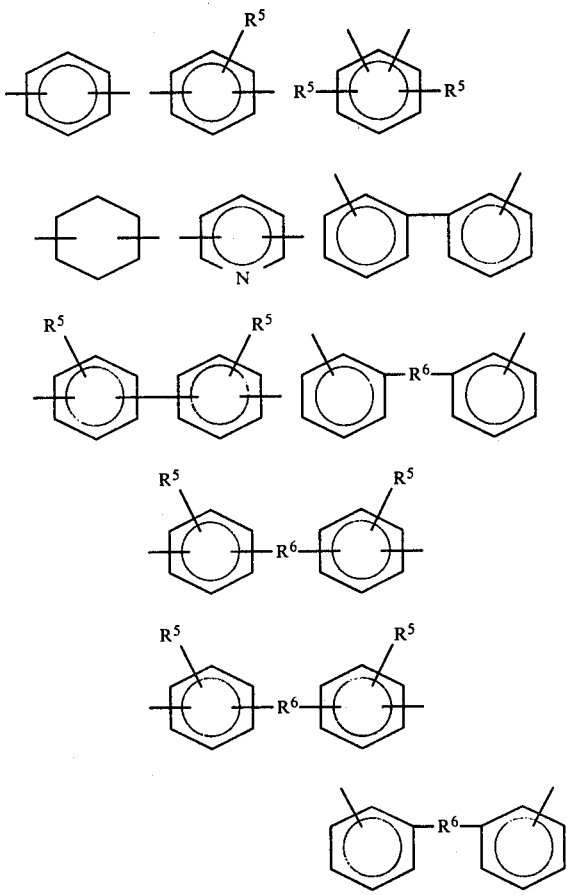

wherein $R^5$ is an alkyl radical containing 1 to 3 carbon atoms $R^6$ is an alkylene radical containing 1 to 4 carbon atoms,

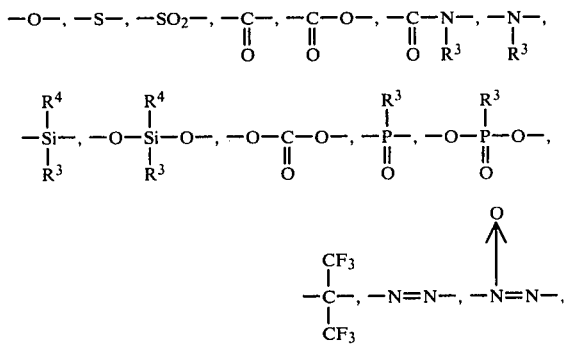

wherein $R^7$ and $R^8$ are selected from the group consisting of an alkyl radical containing 1 to 3 carbon atoms and an aryl radical (cf. U.S. Pat. Nos. 3,657,186 and 3,674,749). The interaction of bis-ortho-aminonitriles and bis-ortho-hydroxynitriles with polyfunctional isocyanates is effected at a temperature within the range of from 150° to 300° C. over a period of from 1 hour to 24 hours.

However, as it has been demonstrated by appropriate tests, the materials produced directly from the above-mentioned reagents feature a high brittleness. During a lasting residence in the air at temperatures of about 300° C. and over a substantial decrease in mechanical strength of said materials is observed, crasks are formed which frequently cause a complete break-down of the final materials.

SUMMARY OF THE INVENTION

It is an object of the present invention to provide such a heat-resistant composition which would possess a sufficient thermal stability and retain high physical properties at temperatures of about 300° C. and over.

This and other objects are accomplished by that in a heat-resistant composition containing an organic or elemento-organic binder and/or a filler, in accordance with the present invention as the binder use is made of at least one compound of the formula:

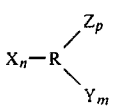

wherein R is an organic radical with a number of carbon atoms of from 2 to 1,000; a radical with a number of carbon atoms of from 2 to 1,000 containing 1 to 1,000 atoms of silicon and/or
1 to 1,000 atoms of fluorine, and/or
1 to 1,000 atoms of chlorine, and/or
1 to 1,000 atoms of bromine, and/or
1 to 1,000 atoms of nitrogen, and/or
1 to 1,000 atoms of sulphur, and/or
1 to 1,000 atoms of phosphorus, and/or
1 to 1,000 atoms of boron, and/or
1 to 1,000 atoms of oxygen, X and Y are $-NH_2$, $-OH$, $-SH$, $-NCO$, $-NCS$, and X and Y being the same or different; Z is $-C\equiv N$, $-C\equiv CH$, Z being located in the same or different positions selected from alpha-, beta-, ortho- and peri-positions relative to X and Y; $n \geq 1$, $m \geq 1$, $p \geq 1$; the components being present in the following proportions, parts by weight:

| binder | 100 |
|---|---|
| filler | 0.1 to 10,000. |

The composition may incorporate both an individual compound of the formula:

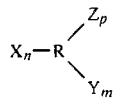

and a mixture of compounds corresponding to this formula.

To improve processability and, in certain cases, enhance physico-mechanical properties of the composition, it is advisable to introduce, into the composition, 1 to 99 parts by weight of at least one of compounds of the formula: $R-P_q$ wherein R is an organic radical with a number of carbon atoms of from 2 to 1,000; a radical with a number of carbon atoms of from 2 to 1,000 containing 1 to 1,000 atoms of silicon and/or
1 to 1,000 atoms of fluorine, and/or 1 to 1,000 atoms of chlorine, and/or
1 to 1,000 atoms of bromine, and/or
1 to 1,000 atoms of nitrogen, and/or
1 to 1,000 atoms of sulphur, and/or
1 to 1,000 atoms of phosphorus, and/or
1 to 1,000 atoms of boron, and/or
1 to 1,000 atoms of oxygen;
P is

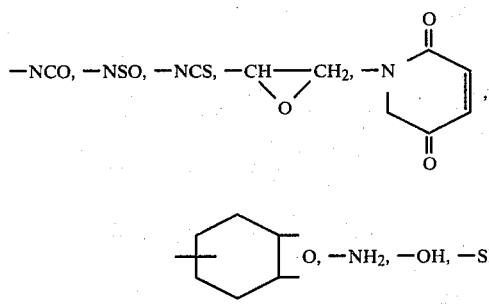

With the view to improve physico-mechanical properties of a heat-resistant composition, it is advisable to incorporate thereinto 8 to 180 parts by weight of at least one of the following compounds: polybenzoxazole, polyimide, polyphenylquinoxaline, polyphenylenesulphide, polybenzimidazole, polyoxadiazole, polytriazine.

As the fillers, the composition may include, e.g. various fibrous fillers (including tissues, ribbons, staple fibres), finely-divided powder-like fillers (such as molybdenum bisulphide, titanium dioxide, graphite, quartz flour, copper, cobalt, nickel, lead, tungsten, colloidal silver, colloidal iron).

Furthermore, various purpose additives may be added into the composition such as stabilizing agents, catalysts, foaming agents, plastifiers, antifriction agents.

Tests performed with a heat-resistant composition according to the present invention show that the use of this composition makes it possible to obtain a wide range of various materials featuring a lasting stability of physical properties during operation at temperatures of about 300° C. and above. Thus, a compression-moulding material based on 3,3'-diamino-4,4'-dicyandiphenyloxide (50 parts by weight), 4,4'-diphenylmethanediisocyanate (50 parts by weight), graphite (20 parts by weight) and a powder-like poly-1,3,4-oxadiazole (250 parts by weight); obtained on the basis of 4,4'-diphenylphthaliddicarboxylic acid and dihydrazide of isophthalic acid) moulded under the pressure of 250 kg/cm² with residence time of one hour at the temperature of 130° C., one hour at the temperature of 170° C. and one hour at the temperature 200° C., followed by heat-treatment at 300° C. for 30 minutes without pressure, has a compression strength at the temperature of 300° C. equal to 980 kg/cm² in the starting condition and 1,100 kg/cm² after thermal ageing in the air at the temperature of 300° C. after 500 hours. At the same time, a compression-moulding material on the basis of 3,3'-diamino-4,4'-dicyandiphenyloxide (50 parts by weight) and 4,4'-diphenylmethanediisocyanate (50 parts by weight) containing no filler has a compression strength at 300° C. of 1,050 kg/cm² in the starting condition and 650 kg/cm² after thermal ageing in the air at the temperature of 300° C. for 500 hours which shows a substantially lower stability against a high-temperature effect. Furthermore, the material without a filler has a substantially higher brittleness which is manifested in its reduced impact resistance. During thermal ageing of such material, microcracks are formed therein thus causing a complete deterioration of this material. On the whole, the use of the composition according to the present invention makes it possible to attain such a combination of properties which is lacking in any other prior art composition known hitherto: high thermal stability, high heat-resistance, increased physico-mechanical and dielectric properties of the final materials with such good technological characteristics of the composition according to the present invention as the absence of solvents, low viscosity, capability of formation of highly-extended systems, moderate temperatures (at most 300° C.) and pressures (at most 500 kg/cm²) of processing.

The composition according to the present invention is characterized by physico-mechanical properties of compression moulding materials (compression strength and bending strength) and adhesive joints (shear stress) at temperatures of 20° C., 300° C., 350° C., 400° C. as well as by abrasion-resistance of grinding wheels produced with the use of the heat-resistant composition according to the present invention.

The composition according to the present invention may be used for the manufacture, by conventional processes, of various materials such as textolites, moulding materials, abrasion instruments, coatings, adhesive joints, foamed materials. Such materials retain their physico-mechanical and dielectric properties at a temperature within the range of from 300° to 400° C. and above.

The use of such compositions makes it possible to combine the process of synthesis of a polymer with the process of manufacture of an article from this polymer, while eliminating the stages of recovery and purification of the polymer. Furthermore, the presence, in the composition, of monomeric and/or oligomeric compounds makes it possible to perform the process of manufacture of articles at moderate temperatures and pressures.

DETAILED DESCRIPTION OF THE INVENTION

Process technology of the preparation of the composition according to the present invention is not complicated. The composition ingredients may be mixed directly in a required ratio. In certain cases it is preferable to preliminary maintain the mixture of ingredients of the binder at a temperature within the range of from 20° to 180° C. over a period of from 0.5 to 50 hours. The thus-produced adduct (addition product) ensures a reduced shrinkage during the manufacture of articles and higher physico-mechanical characteristics.

For a better understanding of the present invention some specific Examples are given hereinbelow by way of illustration.

EXAMPLE 1

A finely-divided mixture of 2 g of a compound of the formula:

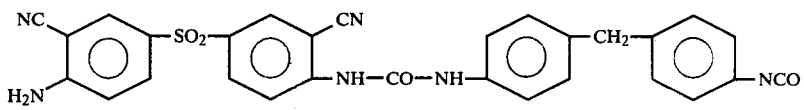

and 1 g of titanium dioxide is placed into a cold mould, heated to the temperature of 170° C. for one hour and compression-moulded at this temperature under the pressure of 50 kg/cm² for 30 minutes. Then the material is heated at the temperature of 300° C. for 30 minutes without pressure. The mould is cooled to the temperature of 20° C. and the article is withdrawn from the mould. It has a cylindrical shape with the diameter of 6 mm and length of 58 mm.

EXAMPLE 2

A mixture of 3.28 g of 2,5-diamino-3,4-dicyanothiophene, 5.12 g of 4,4'-diphenyloxidediisocyanante, 14.3 g of staple glass fibre and 10 g of a finely-divided cobalt powder is placed into a mould, heated to the temperature of 190° C. for two hours, maintained at this temperature and under the pressure of 50 kg/cm² for one hour, heated at the temperature of 300° C. without pressure for one hour, cooled to the temperature of 20° C. and extracted from the mould. A sample is obtained with the diameter of 20 mm and length of 63 mm. Properties of the thus-produced material are shown in Table 1 hereinbelow.

EXAMPLE 3

A mixture of 0.4 g of a powder (with the fineness of 0.25 mm) of polybenzoxazole on the basis of 3,3'-dihydroxy-4,4'-diaminodiphenylmethane and isophthalic acid, 0.8 g of asbestos, 0.24 g of 2,5-diamino-3,4-dicyanothiophene and 0.36 g of 4,4'-diphenylmethanediisocyanate is charged into a mould, heated under the pressure of 300 kg/cm² for 1.5 hour at the temperature of 190° C., at 250° C. for 1.5 hour and without pressure at the temperature of 300° C. for 0.5 hour. The resulting sample has the diameter of 10 mm and height of 15 mm. Properties of the thus-produced material are shown in Tables 3 and 4 hereinbelow.

EXAMPLES 4–43

In accordance with the procedure of adhesive bonding two steel plates, curing the adhesive at the temperature of 190° C. for 3 hours under the pressure of 1 kl/cm², adhesive joints are made using various compositions. Composition ingredients and curing conditions are shown in Table 1. Properties of the adhesive joints are shown in Table 2 hereinbelow.

As it is seen from the Examples, the use of the composition according to the present invention makes it possible to obtain adhesive joints containing high mechanical strength to the temperature of up to 400° C. and to avoid, in bonding, the use of solvents, high temperatures and pressures.

The composition according to the present invention may be useful is aircraft industry, mechanical engineering, tool manufacture, optics, diamond and jewelry production, as well as in other industries necessitating the use of adhesives possessing high heat-resistance.

TABLE 1

| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 4 | ![structure: HC(CH)-C₆H₃(NH₂)-CH₂-C₆H₃(NH₂)(CH)] | 10 | 180° | 1 | 3 |
| | ![structure: OCN-C₆H₄-CH₂-C₆H₄-NCO] | 8 | | | |
| | HO—CH₂—C(—O—CH₂—OH)B₁₀H₁₀ | 1 | | | |
| | asbestos | 5 | | | |
| 5 | ![structure: H₂N-C(CN)=C(CN)-NH₂ and OCN-C₆H₄-CH₂-C₆H₄-CH₂-C₆H₄-NCO] | 10 | 180° | 1 | 3 |
| | HOOC—(CH₂)₅—C(=O)—O—CH₂—C(—O—C(=O)—(CH₂)₅—COOH)B₁₀H₁₀ | 20 | | | |
| | aluminium | 5 | | | |
| 6 | ![structure: thiophene with NC, CN, OCN, NCO substituents] | 10 | 200° | 5 | 2 |
| | ![structure: thiophene with NC, CN, SH, HS substituents] | 17 | | | |
| | | 13 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| | HO—CH₂—CB₁₀H₁₀C—CH₂—OH | 30 | | | |
| | nickel | 5 | | | |
| 7 | [structure with CN, NCS, SCN, SCN groups on cyclopentene rings linked by CH₂] | 15 | | | |
| | [pyridine structure with NH₂, CN, CH₃ groups] | 15 | 200° | 3 | 3 |
| | [carborane epoxide structure with B₁₀H₁₀] | 0.6 | | | |
| | aluminium | 30 | | | |
| 8 | [structure with CN, OH, N—N, C=O, phenyl] | 13 | | | |
| | [pyrrole structure with CN, NSO, OSN, CF₃] | 12 | 180° | 2 | 3 |

TABLE 1-continued

| Example No. 1 | Composition ingredients ingredient 2 | amount, g 3 | Conditions of curing of the composition | | duration, hours 6 |
|---|---|---|---|---|---|
| | | | temperature, °C. 4 | pressure kg/cm² 5 | |
| | $HO \pm CH_2-C\underset{B_{10}H_{10}}{\overset{O}{\diagup}}C-CH_2-O-C(CH_2)_5C=O \pm CH_2-C\underset{B_{10}H_{10}}{\overset{O}{\diagup}}C-CH_2-OH$ $n = 5$ | 250 | | | |
| | aluminium | 100 | | | |
| 9 | (hexamethyl-triisocyanato borazine structure with NCO, N-CH₃, B groups) | 15 | | | |
| | (bis(mercapto-ethynyl-phenyl)dimethylsilane structure) | 20 | 210° | 0.5 | 2 |
| | aerosil | 0.2 | | | |
| 10 | (diaminodicyanothiophene disulfide structure) | 2.5 | | | |
| | (azobis(nitrosobenzene) structure, OSN–C₆H₄–N=N–C₆H₄–NSO) | 2.5 | 180° | 10 | 2 |
| | (bis(carboxy-B₁₀H₁₀-carboxy)phenyl diester structure) | 25 | | | |
| | asbestos | 250 | | | |

TABLE 1-continued

| Example No. | Composition ingredients | amount, g | Conditions of curing of the composition | | |
|---|---|---|---|---|---|
| | ingredient | | temperature, °C. | pressure kg/cm² | duration, hours |
| 1 | 2 | 3 | 4 | 5 | 6 |
| 11 | HC≡C–⟨C₆H₃(NH₂)⟩–P(=O)–⟨C₆H₃(NH₂)⟩–C≡CH | 21 | 170° | 0.5 | 3 |
| | NC–⟨C₆H₃(OSN)⟩–C(CF₃)(CF₃)–⟨C₆H₃(NSO)⟩–CN | 23 | | | |
| | H₃C–C–O–C–CH₃ / B₁₀H₁₀, tungsten | 1 | | | |
| | | 50 | | | |
| 12 | HO–⟨C₆H₄⟩–S–⟨C₆H₄⟩–OH | 10 | 180° | 0.5 | 3 |
| | HC≡C–⟨C₆H₃(OCN)⟩–C(=O)–O–⟨C₆H₃(NCO)⟩–C≡CH / B₁₀H₁₀ | 20 | | | |
| | nickel | 20 | | | |
| | HC≡C–⟨C₆H₃(OCN)⟩–SO₂–⟨C₆H₃(NCO)⟩–C≡CH | 5 | | | |
| | [–⟨C₆H₄(NCO)⟩–CH₂–⟨C₆H₃(NCO)⟩–CH₂–⟨C₆H₄(NCO)⟩–]ₙ, n ~ 500 | 20 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 13 | NC—C(OH)=C(CN)—C(=O)—O—C(OH)= (structure with CN, OH, HO, O groups) | 25 | 200° | 1 | 2 |
| | H₂N—CH₂—C(B₁₀H₁₀)—CH₂—NH₂ | 0.1 | | | |
| | aerosil | 0.01 | | | |
| 14 | (structure with NC, CH, NH₂, HO, HC≡C, CO, N, CO groups) | 20 | 200° | 0.5 | 1 |
| | [—C₆H₄—SO₂—C₆H₄—SO₂—]ₙ with NCS groups, n = 5 | 20 | | | |
| | C₆H₅—C(=O)—O—B₁₀H₁₀—O—C(=O)—C₆H₄—CH₃ encryptite | 1 | | | |
| 15 | OCN(CH₂)₇NCO | 10 | 190° | 0.7 | 1.5 |
| | (structure with NC, SCN groups on benzene ring) | 5 | | | |
| | [—C₆H₄—S—C₆H₄—S—]ₙ with CN, NCS groups, n = 100 | 20 | | | |
| | HO(CH₂)₇NH₂ HO(CH₂)₇C(B₁₀H₁₀)—O—C(CH₂)₇OH | 19 100 | | | |
| | copper | 50 | | | |

TABLE 1-continued

| Example No. | Composition ingredients ingredient | amount, g | Conditions of curing of the composition temperature, °C. | pressure kg/cm² | duration, hours |
|---|---|---|---|---|---|
| 1 | 2 | 3 | 4 | 5 | 6 |
| 16 | melamine (H₂N-C(=N-C(NH₂)=N-C(NH₂)=N-)) | 5 | 200° | 5 | 1 |
|  | bis(4-amino-3-cyanophenoxy)benzene polymer | 25 |  |  |  |
|  | 2,4,5-tricyano-1,3-diisocyanatobenzene | 30 |  |  |  |
|  | OCN—CH₂—CB₁₀H₁₀C—CH₂—NCO | 300 |  |  |  |
|  | nickel | 150 |  |  |  |
| 17 | poly(phenylsilsesquioxane) [Si(OH)(C₆H₅)O]ₙ, n = 200 | 5 | 170° | 1 | 4 |
|  | 4-cyano-3-isocyanatophenyl phosphine oxide derivative | 5 |  |  |  |
|  | HO—CH₂—C(B₁₀H₁₀)—O—C—CH₂—OH | 50 |  |  |  |
|  | quartz flour | 20 |  |  |  |

TABLE 1-continued
| Example No. | Composition ingredients ingredient | amount, g | Conditions of curing of the composition temperature, °C. | pressure kg/cm² | duration, hours |
|---|---|---|---|---|---|
| 18 | 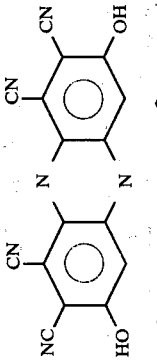 asbestos | 20 20 15 | 200° | 0.5 | 5 |
| 19 | 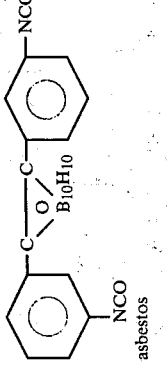  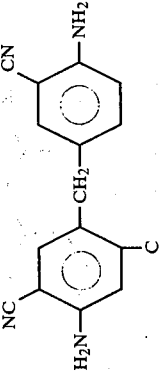 encryptite | 20 20 2 15 | 210° | 1 | 2 |
| 20 | 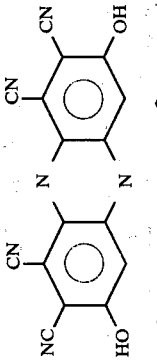  | 15 | 150° | 0.2 | 3 |

TABLE 1-continued
| Example No. | Composition ingredients ingredient | amount, g | Conditions of curing of the composition | | |
|---|---|---|---|---|---|
| | | | temperature, °C. | pressure, kg/cm² | duration, hours |
| 1 | 2 | 3 | 4 | 5 | 6 |
| |  asbestos | 15 | | | |
| |  | 5 | | | |
| |  | 0.5 | | | |
| 21 | 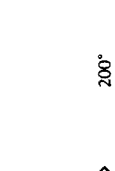 | 0.5 | 200° | 2 | 1 |
| |  nickel | 50 | | | |
| |  | 20 | | | |
| |  | 22 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 22 | (benzene ring with CN, OH, CN, NC, OH, CN substituents) | 18 | 210° | 0.5 | 1 |
| | HOOC—C—COOH / B₁₀H₁₀ | 4 | | | |
| | quartz flour | 10 | | | |
| 23 | (HC≡C-substituted aniline azo ester structure with H₂N and C≡CH groups) | 19 | 190° | 0.5 | 3 |
| | (bis-benzodioxaborole with NCO and OCN substituents on phenylene) | 21 | | | |
| | H₃C—C—O—C—CH₃ / B₁₀H₁₀ | 15 | | | |
| | nickel | 10 | | | |
| | (bis-amide diphenyl structure with CN, SH, NH—CO—, —CO—NH—, CN, SH groups) | 15 | | | |

TABLE 1-continued
| Example No. | Composition ingredients ingredient | amount, g | Conditions of curing of the composition temperature, °C. | pressure kg/cm² | duration, hours |
|---|---|---|---|---|---|
| 1 | 2 | 3 | 4 | 5 | 6 |
| 24 | 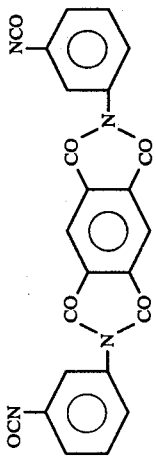 | 15 | 215° | 0.3 | 2.5 |
|  | 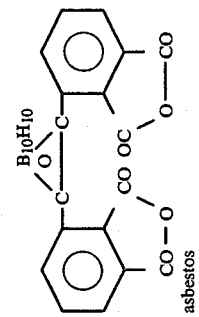 | 50 |  |  |  |
|  | asbestos | 20 |  |  |  |
| 25 | 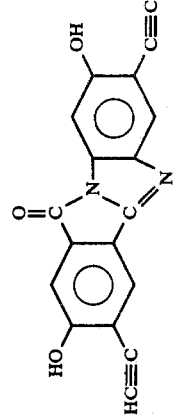 | 30 | 195° | 5 | 1 |
|  | 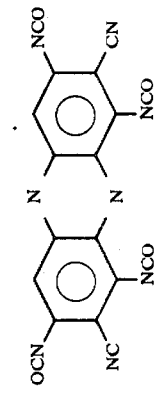 | 30 |  |  |  |
|  |  | 100 |  |  |  |
|  | nickel | 30 |  |  |  |
|  |  | 20 |  |  |  |

TABLE 1-continued

| Example No. 1 | Composition ingredients ingredient 2 | amount, g 3 | Conditions of curing of the composition temperature, °C. 4 | pressure kg/cm² 5 | duration, hours 6 |
|---|---|---|---|---|---|
| 26 | 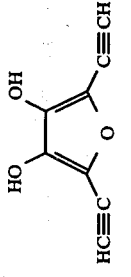 (structure with OH, C≡CH, furan) | 20 | 190° | 0.1 | 1 |
|  | CH₃—C(O/B₁₀H₁₀)—O—C₆H₄—O—C(O/B₁₀H₁₀)—CH₃ | 25 |  |  |  |
|  | aerosil | 0.5 |  |  |  |
| 27 | 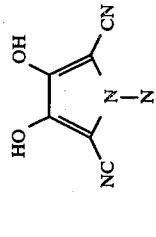 (pyrazole structure with OH, CN) | 35 | 200° | 0.4 | 1 |
|  | 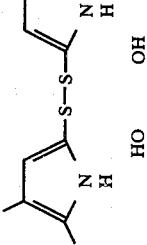 (Se-containing structure with NCO, CN, OCN, S-S) | 150 |  |  |  |
|  | HO—CH₂—C(O/B₁₀H₁₀)—CH₂—OH | 300 |  |  |  |
|  | glass microbeads | 100 |  |  |  |
| 28 | 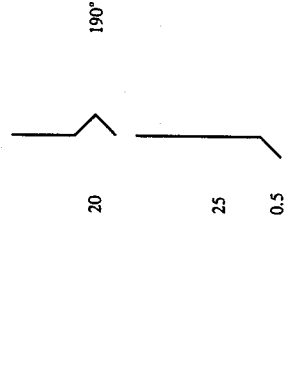 (pyrrole dimer structure with NCO, CN, S-S) | 25 | 200° | 0.9 | 2 |
|  | 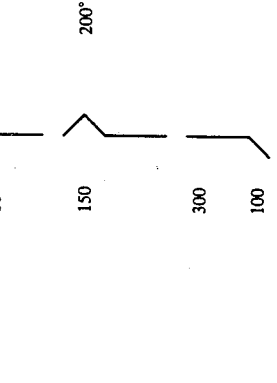 (pyrrole structure with OH, CN) | 15 |  |  |  |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 29 | F₃C—C—CF₃ / B₁₀H₁₀ | 25 | | | |
| | aerosil | 0.2 | | | |
| | HS—⌬—C(=N—N)—S—⌬—SH with C≡CH and HC≡C substituents | 22 | | | |
| | SCN—⌬—SO₂—⌬—SO₂—⌬—NCS, n=20 | 18 | 210° | 0.8 | 1 |
| | CH₃—C(—O—)—C—CH₂—NH₂ / B₁₀H₁₀ | 20 | | | |
| | copper | 5 | | | |
| 30 | HC≡C—⌬—C(CF₃)(CF₃)—⌬—NSO with C≡CH and OSN substituents | 25 | | | |
| | HO—(CF₂)₇—OH | 15 | 200° | 2 | 0.5 |
| | HO—CH₂—C(—)—C—CH₂—OH / B₁₀H₁₀ | 5 | | | |
| | asbestos | 0.8 | | | |
| | SCN—⌬—S—⌬—NCS with HC≡C and C≡CH substituents | 17 | | | |

TABLE 1-continued
| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 31 | 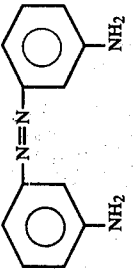 HO—CH₂—CB₁₀H₁₀L—CH₂—OH quartz | 5 25 10 | 180° | 0.7 | 3 |
| 32 | 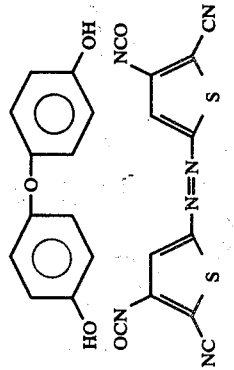 NH—CO—NH—CH₂—CB₁₀H₁₀C—CH₂—NH—CO—NH— asbestos | 17 13 100 25 | 190° | 5 | 3 |
| 33 | 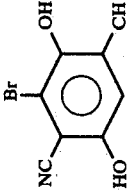 CH₃—CH₂—CB₁₀H₁₀C—CH₂—CH₃ nickel | 20 20 5 10 | | | |

TABLE 1-continued
| Example No. | Composition ingredients ingredient | amount, g | Conditions of curing of the composition | | |
|---|---|---|---|---|---|
| | | | temperature, °C. | pressure kg/cm² | duration, hours |
| 34 |  | 30 | 200° | 0.5 | 1.5 |
| |  | 10 | | | |
| | 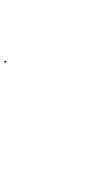 | 10 | | | |
| |  copper | 10 | | | |
| 35 |  | 25 | 180° | 0.2 | 3 |
| |  | 5 | | | |
| | 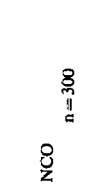 | 20 | | | |
| | asbestos | 5 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 36 | (structure with NH₂, CN, phenyl ether, Si(CH₃)₂, H₂N, NC) | 30 | 200° | 0.4 | 2 |
| | H₃C–C₆H₃(NCO)₂ | 10 | | | |
| | (bis-maleimide with B₁₀H₁₀, aerosil) | 5 | | | |
| | (tetra-hydroxamic acid structure) | 14 | | | |
| 37 | (NCS–C₆H₄–C(–O–)–C₆H₄–C≡CH with SCN, HC≡C) | 15 | 170° | 1 | 3 |
| | (spiro cyclic structure) | 15 | | | |
| | HS–CH₂–C≡C–C–O–C–CH₂–SH / B₁₀H₁₀ | 10 | | | |
| | copper | 5 | | | |

TABLE 1-continued
| Example No. | Composition ingredients ingredient | amount, g | Conditions of curing of the composition | | |
|---|---|---|---|---|---|
| | | | temperature, °C. | pressure kg/cm² | duration, hours |
| 38 |  | 15 | 190° | 0.5 | 2 |
| |  | 10 | | | |
| | OCN—CB$_{10}$H$_{10}$C—NCO<br>quartz | 50<br>10 | | | |
| 39 |  | 25 | 195° | 0.2 | 3 |
| |  | 25 | | | |
| | <br>nickel | 15<br>10 | | | |
| |  | 20<br>20 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 40 | 2,4-diisocyanato-1-methylbenzene (NCO, CH₃, NCO) | 30 | 100° | 0.5 | 4 |
| | HO—CH₂—O—C—O—C—CH₂—OH with B₁₀H₁₀ | 15 | | | |
| | asbestos | 20 | | | |
| 41 | 2,6-dimercapto-3,7-diethynylnaphthalene (SH, C≡CH, HS, HC≡C) | 25 | 190° | 0.5 | 4 |
| | OCN—CH—CH₂—(CF₂)—CH₂—CH—NCO with CN, CN | 10 | | | |
| | HO—CH₂—O—C—O—C—CH₂—OH with B₁₀H₁₀ | 5 | | | |
| | nickel | 20 | | | |
| 42 | 1-phenyl-3,5-diisocyanato-1,2,4-triazole (OCN, N—N, NCO) | 25 | 220° | 0.8 | 5 |
| | dihydroxydicyanopyrazinopyrazine (HO, N, N, OH; NC, N, N, CN) | 25 | | | |
| | C₆H₅—CB₁₀H₁₀C—C₆H₅ | 20 | | | |
| | aluminium | 15 | | | |

TABLE 1-continued

| Example No. | Composition ingredients ingredient | amount, g | Conditions of curing of the composition | | |
|---|---|---|---|---|---|
| | | | temperature, °C. | pressure kg/cm² | duration, hours |
| 1 | 2 | 3 | 4 | 5 | 6 |
| 43 | OCN—⬡(NCO)—C≡CH / HC≡C | 15 | 200° | 0.4 | 2 |
| | H₂N—⌬—C(CF₃)(CF₃)—O—⌬(OH)(C≡CH) | 25 | | | |
| | HO—CH₂—C—O—C—CH₂—OH / B₁₀H₁₀ | 25 | | | |
| | aerosil | 10 | | | |

TABLE 2

| Example No. | Breaking shear stress of the adhesive joint, kg/cm² | | | | | | | |
|---|---|---|---|---|---|---|---|---|
| | in the starting state at the temperature, °C. | | | | Test temperature, °C. | after residence in the air at the temperature, °C. | | |
| | | | | | | 300° C. 100 hours | 350° C. 100 hours | 400° C. 50 hours |
| 1 | 2 | 3 | 4 | 5 | 6 | 7 | 8 | 9 |
| 4 | 300 | 90 | 90 | 80 | 20° | 150 | 140 | 100 |
| | | | | | 400° | — | — | 80 |
| 5 | 250 | 100 | 90 | 90 | — | — | — | — |
| 6 | 300 | 150 | 90 | 90 | — | — | — | — |
| 7 | 265 | 130 | 80 | 80 | 20° | 150 | 140 | 130 |
| | | | | | 400° | — | — | 80 |
| 8 | 265 | — | — | 85 | 400° | — | — | 85 |
| 9 | 190 | 130 | 95 | 95 | 400° | — | — | 85 |
| 10 | 310 | — | — | 93 | 400° | — | — | 93 |
| 11 | 250 | — | — | 90 | 400° | — | — | 90 |
| 12 | 300 | — | — | 85 | 400° | — | — | 85 |
| 13 | 270 | — | — | 90 | 400° | — | — | 90 |
| 14 | 250 | — | 78 | 78 | 400° | — | — | 78 |
| 15 | 195 | — | — | 90 | 400° | — | — | 90 |
| 16 | 350 | — | — | 98 | 400° | — | — | 98 |
| 17 | 350 | — | — | 95 | 400° | — | — | 95 |
| 18 | 200 | — | — | 80 | 400° | — | — | 80 |
| 19 | 350 | — | — | 92 | — | — | — | — |
| 20 | 290 | — | — | 85 | 400° | — | — | 75 |
| 21 | 370 | — | — | 75 | 400° | — | — | 60 |
| 22 | 200 | 200 | 98 | 95 | 400° | — | — | 95 |
| 23 | 320 | — | — | 87 | 400° | — | — | 85 |
| 24 | 275 | — | — | 79 | 400° | — | — | 76 |
| 25 | 300 | — | — | — | — | — | — | — |
| 26 | 250 | 150 | 80 | 75 | — | — | — | — |
| 27 | 195 | — | — | 90 | — | — | — | — |
| 28 | 230 | — | — | 79 | 400° | — | — | 79 |
| 29 | 225 | — | — | 80 | 400° | — | — | 80 |
| 30 | 240 | 190 | 79 | 87 | 400° | — | — | 85 |
| 31 | 195 | 100 | — | 88 | 400° | — | — | 88 |
| 32 | 285 | — | — | 75 | 400° | — | — | 70 |
| 33 | 350 | — | — | 75 | 400° | — | — | 75 |
| 34 | 300 | 200 | 90 | 90 | 350° | — | 90 | — |
| 35 | 250 | 200 | 89 | 85 | 400° | — | — | 85 |
| 36 | 195 | 180 | 80 | 80 | 400° | — | — | 80 |
| 37 | 280 | — | — | 95 | 400° | — | — | 93 |
| 38 | 295 | — | — | — | — | — | — | — |
| 39 | 385 | — | — | 98 | 400° | — | — | 95 |
| 40 | 200 | — | — | 60 | 400° | — | — | 60 |
| 41 | 190 | 180 | 170 | 68 | 400° | — | — | 68 |
| 42 | 220 | — | — | — | 400° | — | — | 90 |
| 43 | 310 | — | — | — | 350° | — | 95 | — |

EXAMPLE 44

3.5 g of a powder-like diamond with the fineness of below 50 mc are mixed with 0.6 g of a compound of the formula;

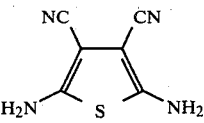

0.8 g of a compound of the formula:

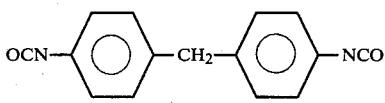

and 20 g of a powder-like copper. The composition is placed into a mould, heated to the temperature of 120° C. without pressure, to 210° C. under the pressure of 500 kg/cm² and maintained at the temperature of 210° C. under the pressure of 560 kg/cm² for 0.5 hour. Properties of the thus-produced abrasive wheel are shown in Table 4 hereinbelow.

EXAMPLES 45–77

In acccordance with the procedure of Example 62 abrasive tools are made from different composition. Composition ingredients and conditions of curing thereof are shown in Table 7. Data illustrating abrasion-resistance of the abrasive tool made of the composition are shown in Table 8 hereinbelow.

The abrasive tool made of the composition according to the present invention is a multi-purpose one, since it makes possible to process both steels and superhard materials such as cubic boron nitride. The thus-manufactured tool has an increased abrasion-resistance and retains it upon operation under severe conditions, i.e. without cooling and high feed rates of the abrasive tool. This tool may be employed in various applications: mechanical engineering, aircraft industry, glass and jewelry production.

TABLE 3

| Example No. | Composition ingredients | | Conditions of curing of the composition | | |
|---|---|---|---|---|---|
| | Ingredient | amount, g | temperature, °C. | pressure, kg/cm² | duration, hours |
| 1 | 2 | 3 | 4 | 5 | 6 |
| 45 | 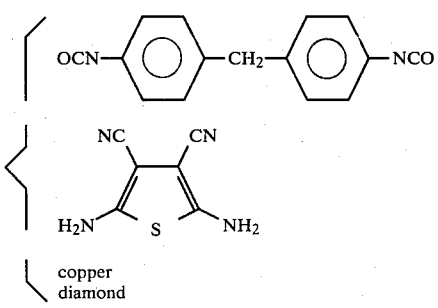 | 0.9 | 250° | 300 | 0.5 |
| | | 0.6 | | | |
| | copper | 20 | | | |
| | diamond | 3.9 | | | |

TABLE 3-continued

| Example No. 1 | Composition ingredients Ingredient 2 | amount, g 3 | temperature, °C. 4 | pressure, kg/cm² 5 | duration, hours 6 |
|---|---|---|---|---|---|
| 46 | [structure: HO, OH, NC, CN, O] | 0.8 | 230° | 500 | 0.4 |
|  | OCN—(CF₂)₇—NCO | 0.8 | | | |
|  | graphite | 4 | | | |
|  | bismuth | 2 | | | |
|  | copper | 16 | | | |
|  | boron nitride | 4 | | | |
| 47 | [structure: NC, CN, OCN, NCO, N, N, OC, CO] | 0.8 | 240° | 500 | 0.3 |
|  | [structure: HO, OH, NC, CN] | 0.9 | | | |
|  | copper | 19 | | | |
|  | diamond | 4 | | | |
| 48 | [structure: OCN—⟨⟩—CH₂—[⟨⟩—CH₂]ₙ—⟨⟩—NCO, NCO; n = 100] | 0.75 | 230° | 350 | 1 |
|  | [structure with pyridine rings, H₃C, H₂N, CN, NH₂, CH₂; n = 500] | 0.75 | | | |
|  | [polyimide structure; n = 100] | 1 | | | |
|  | copper | 20 | | | |
|  | silicon carbide | 4 | | | |
|  | [structure: NC, CN, SCN, NCS, CH₂] | 0.8 | | | |

TABLE 3-continued

| Example No. 1 | Composition ingredients Ingredient 2 | amount, g 3 | temperature, °C. 4 | pressure, kg/cm² 5 | duration, hours 6 |
|---|---|---|---|---|---|
| 49 | HO—⟨C₆H₄⟩—OH | 0.6 | 250° | 500 | 0.75 |
|  | copper | 15 |  |  |  |
|  | nickel | 8 |  |  |  |
|  | diamond | 3.5 |  |  |  |
| 50 | [borazine derivative with NCO, CH₃, isopropyl substituents] | 0.9 | 240° | 250 | 0.5 |
|  | HC≡C—⟨C₆H₃(NH₂)⟩—P(=O)—⟨C₆H₃(NH₂)⟩—C≡CH | 0.6 |  |  |  |
|  | copper | 20 |  |  |  |
|  | diamond | 4 |  |  |  |
| 51 | NC—⟨C₆H₃(OSN)⟩—C(CF₃)₂—⟨C₆H₃(NSO)⟩—CN | 0.6 | 210° | 400 | 0.4 |
|  | NC—⟨C₆H₂(NH₂)(CN)⟩—S—S—⟨C₆H₂(NH₂)(CN)⟩—CN | 0.9 |  |  |  |
|  | [—(N=N)—C—O—⟨C₆H₄⟩—]ₙ, n = 400 | 3 |  |  |  |
|  | nickel | 15 |  |  |  |
|  | boron nitride | 6 |  |  |  |
| 52 | HC≡C—⟨C₆H₃(OCN)⟩—C—C—⟨C₆H₃(NCO)⟩—C≡CH with B₁₀H₁₀ bridge | 0.8 | 220° | 400 | 0.3 |
|  | HO—CH₂—C—C—CH₂—OH with B₁₀H₁₀ bridge | 0.9 |  |  |  |
|  | copper | 20 |  |  |  |
|  | silicon carbide | 5 |  |  |  |
|  | HO—⟨C₆H₄⟩—S—[⟨C₆H₄⟩—S]ₙ—⟨C₆H₄⟩—OH, n = 50 | 0.7 |  |  |  |

TABLE 3-continued

| Example No. 1 | Composition ingredients Ingredient 2 | amount, g 3 | temperature, °C. 4 | pressure, kg/cm² 5 | duration, hours 6 |
|---|---|---|---|---|---|
| 53 | [structure: OSN / NC — C₆H₃ — N=N — C₆H₃ — CN / NSO] | 0.7 | 250° | 500 | 0.5 |
| | copper | 19 | | | |
| | diamond | 4 | | | |
| 54 | [structure: HO / HC≡C — C₆H₂ — (CO)₂N — C₆H₂(CN)₂ — NH₂] | 0.9 | 245° | 350 | 0.8 |
| | [structure: SCN—C₆H₄—SO₂—[C₆H₄—SO₂]ₙ—C₆H₄—NCS, n = 5] | 0.5 | | | |
| | sital with a negative coefficient of linear expansion | 5 | | | |
| | nickel | 18 | | | |
| | boron nitride | 5 | | | |
| 55 | [structure: HO—C₆H₂(CN)—N=N—C₆H₂(CN)(CN)—OH] | 0.6 | 250° | 500 | 0.5 |
| | OCN—(CH₂)—NCO | 0.3 | | | |
| | [structure: OCN—C₆H₄—CH(C₆H₄—NCO)—C₆H₄—NCO] (triphenylmethane triisocyanate) | 0.8 | | | |
| | copper | 18 | | | |
| | diamond | 20 | | | |
| 56 | [structure: melamine, H₂N—C₃N₃(NH₂)—NH₂] | 0.6 | 250° | 400 | 0.75 |
| | [structure: OCN—C₆H₂(CN)(NCO)—CN, tetrasubstituted benzene with OCN, NCO, CN, CN] | 0.9 | | | |
| | molybdenum bisulphide | 3 | | | |
| | nickel | 20 | | | |
| | corundum | 7 | | | |

TABLE 3-continued

| Example No. 1 | Composition ingredients Ingredient 2 | amount, g 3 | temperature, °C. 4 | pressure, kg/cm² 5 | duration, hours 6 |
|---|---|---|---|---|---|
| 57 | [phenylsilanol dimer structure: (C₆H₅)(OH)₂Si—C₆H₄—Si(OH)₂(C₆H₅)]ₙ | 0.6 | 250° | 500 | 0.25 |
|  | OCN—(CF₂)₅—NCO | 0.3 |  |  |  |
|  | HC≡C—C₆H₂(NCO)₂—C≡CH (with OCN and NCO on ring) | 0.7 |  |  |  |
|  | molybdenum | 30 |  |  |  |
|  | boron nitride | 8 |  |  |  |
| 58 | bis(2-mercapto-3,4-dicyanopyrrolyl) disulfide: HS—[pyrrole(NC)(CN)(NH)]—S—S—[pyrrole(NH)(CN)(NC)]—SH | 0.7 | 250° | 500 | 0.5 |
|  | bis(3-isocyanatophenyl)-carborane (B₁₀H₁₀) epoxide structure | 0.8 |  |  |  |
|  | copper | 19.5 |  |  |  |
|  | diamond | 4 |  |  |  |
| 59 | OCN—C(=N—N=)O—C—NCO (oxadiazole with NCO groups) | 0.9 | 210° | 300° | 0.25 |
|  | HC≡C—C(OH)=C—O—[benzene]—O—C=C(OH)—C≡CH (benzofuran diol diacetylene) | 0.8 |  |  |  |
|  | nickel | 20 |  |  |  |
|  | fluoroplastic-4 | 2 |  |  |  |
|  | silicon carbide | 5 |  |  |  |
| 60 | OCN—C₆F₂(CN)₂—NCO (tetrasubstituted difluorobenzene with 2 NCO and 2 CN) | 0.7 | 250° | 500 | 0.5 |
|  | HO—[C₆H₄—O—C₆H₄—O—C₆H₄]ₙ—OH, n = 5 | 0.9 |  |  |  |
|  | copper | 20 |  |  |  |
|  | diamond | 4 |  |  |  |

TABLE 3-continued

| Example No. | Composition ingredients Ingredient | amount, g | Conditions of curing of the composition | | |
|---|---|---|---|---|---|
| | | | temperature, °C. | pressure, kg/cm² | duration, hours |
| 1 | 2 | 3 | 4 | 5 | 6 |
| 61 | [structure: bis(cyano-isocyanato-phenyl) diketopiperazine] | 0.5 | 215° | 400 | 0.2 |
| | [structure: bis(amino-ethynylphenyl) oxadiazole] | 1 | | | |
| | nickel | 21 | | | |
| | graphite | 2 | | | |
| | corundum | 7 | | | |
| 62 | [structure: bis(isocyanato-phthalimido)benzene] | 0.5 | 230° | 500 | 0.4 |
| | [structure: N-phenyl-N'-(mercapto-methylphenyl) benzamide] | 0.8 | | | |
| | copper | 20 | | | |
| | diamond | 5 | | | |
| 63 | [structure: dihydroxy-diethynyl benzimidazoisoindolone] | 0.4 | 245° | 500 | 0.25 |
| | [structure: tris(isothiocyanatophenyl)phosphine oxide] | 0.9 | | | |
| | nickel | 25 | | | |
| | boron nitrate | 7 | | | |

TABLE 3-continued

| Example No. | Composition ingredients Ingredient | amount, g | temperature, °C. | pressure, kg/cm² | duration, hours |
|---|---|---|---|---|---|
| 1 | 2 | 3 | 4 | 5 | 6 |
| 64 | [structure: phenazine-like with OCN, NCO, CN groups] | 0.8 | 220° | 400 | 0.75 |
| | [bisphenol A structure] HO-C₆H₄-C(CH₃)₂-C₆H₄-OH | 0.8 | | | |
| | permalloy | 23 | | | |
| | diamond | 6 | | | |
| 65 | [structure: benzene with OSN, NSO, CN, CN groups] | 0.6 | 200° | 450 | 0.4 |
| | [furan structure with HO, OH, C≡CH groups] | 0.9 | | | |
| | nickel | 21 | | | |
| | copper | 10 | | | |
| | diamond | 5 | | | |
| 66 | [anthraquinone structure with H₂N, NH₂, C≡CH groups] | 0.9 | 250° | 500 | 0.4 |
| | [polymer structure with OCN groups, n = 100] | 0.6 | | | |
| | nickel | 25 | | | |
| | boron nitride | 6 | | | |
| 67 | [hydroquinone] HO-C₆H₄-OH | 0.7 | 200° | 400 | 1 |
| | [benzene with OCN, CN, NCO groups] | 0.9 | | | |
| | tungsten | 35 | | | |
| | silicon carbide | 5 | | | |
| | [4,4'-diaminobenzophenone] H₂N-C₆H₄-CO-C₆H₄-NH₂ | 0.5 | | | |

TABLE 3-continued

| Example No. 1 | Composition ingredients Ingredient 2 | amount, g 3 | temperature, °C. 4 | pressure, kg/cm² 5 | duration, hours 6 |
|---|---|---|---|---|---|
| 68 | ![structure: bis(4-isothiocyanato-3-ethynylphenyl) phthalide-like structure with central C bonded to two SCN/C≡CH phenyl groups and a benzoate-O-C=O ring] | 1 | 250° | 300 | 0.75 |
|  | nickel | 10 |  |  |  |
|  | copper | 20 |  |  |  |
|  | diamond | 4 |  |  |  |
| 69 | ![structure: tris(4-isocyanato-3-ethynylphenyl)phosphine] | 1.2 | 210° | 300 | 0.4 |
|  | ![structure: 4,4'-diaminobiphenyl H₂N—C₆H₄—C₆H₄—NH₂] | 0.5 |  |  |  |
|  | tungsten | 25 |  |  |  |
|  | graphite | 2 |  |  |  |
|  | boron nitride | 5 |  |  |  |
| 70 | HO—CH₂—CB₁₀H₁₀C—CH₂—OH | 0.8 | 250° | 500 | 0.5 |
|  | ![structure: bis(3,4-diisocyanatophenyl)sulfur dihydroxide S(OH)₂] | 0.8 |  |  |  |
|  | copper | 20 |  |  |  |
|  | diamond | 4 |  |  |  |
| 71 | ![structure: 4,4'-azobis(2-cyanophenol) — HO—C₆H₃(CN)—N=N—C₆H₃(CN)—OH] | 1 | 250° | 250 | 0.5 |
|  | ![structure: 2,4-diisocyanato-1-methylbenzene (OCN—C₆H₃(CH₃)—NCO)] | 0.5 |  |  |  |
|  | tungsten | 25 |  |  |  |
|  | diamond | 5 |  |  |  |
|  | ![structure: diaminomaleonitrile (NC)₂C=C(NH₂)₂] | 0.4 |  |  |  |

TABLE 3-continued
| Example No. | Composition ingredients Ingredient | amount, g | temperature, °C. | pressure, kg/cm² | duration, hours |
|---|---|---|---|---|---|
| 72 | 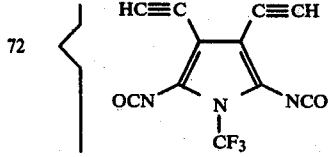 | 1 | 250° | 500 | 0.4 |
|  | nickel | 25 | | | |
|  | molybdenum bisulphide | 1 | | | |
|  | boron nitride | 5 | | | |
| 73 | 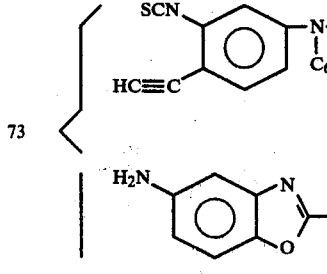 | 1.2 | 225° | 400 | 0.4 |
|  | 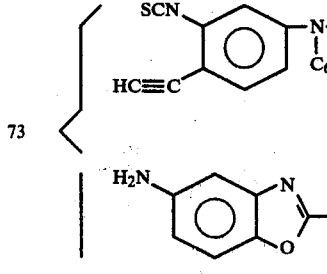 | 0.4 | | | |
|  | molybdenum | 25 | | | |
|  | diamond | 4 | | | |
| 74 | 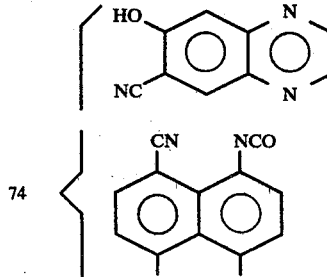 | 1 | 240° | 500 | 0.5 |
|  | 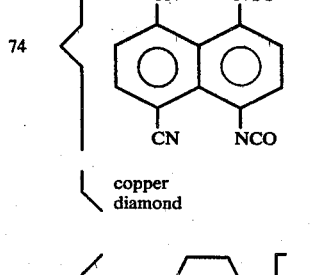 | 0.6 | | | |
|  | copper | 20 | | | |
|  | diamond | 3.9 | | | |
| 75 | 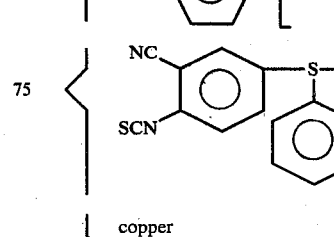 | 0.8 | 224° | 450 | 0.5 |
|  | 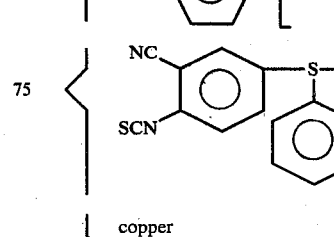 | 0.8 | | | |
|  | copper | 23 | | | |
|  | diamond | 3.9 | | | |
| 76 | 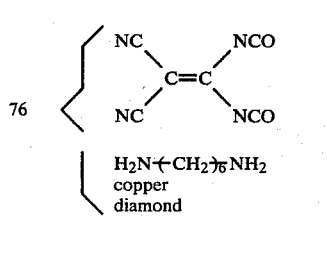 | 0.8 | 250° | 500 | 0.5 |
|  | H₂N(CH₂)₆NH₂ | 0.8 | | | |
|  | copper | 20 | | | |
|  | diamond | 4 | | | |

TABLE 3-continued

| Example No. 1 | Composition ingredients Ingredient 2 | Conditions of curing of the composition | | | |
|---|---|---|---|---|---|
| | | amount, g 3 | temperature, °C. 4 | pressure, kg/cm² 5 | duration, hours 6 |
| 77 | [structure with SCN, OCN, Se, NCS, NCO groups] | 0.9 | 200° | 450 | 0.5 |
| | [structure with HO, OH, NC, CN groups] | 0.5 | | | |
| | nickel | 24 | | | |
| | boron nitride | 5 | | | |

TABLE 4

| Example No. | abrosion-resistance, mg/g of a hard alloy |
|---|---|
| 45 | 0.26 |
| 47 | 0.28 |
| 50 | 0.30 |
| 53 | 0.25 |
| 55 | 0.21 |
| 58 | 0.20 |
| 60 | 0.18 |
| 70 | 0.11 |
| 74 | 0.17 |
| 76 | 0.30 |

EXAMPLE 78

20 g of a polyisocyanate of the formula:

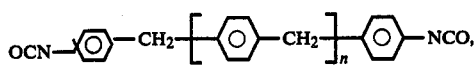

$n = 1$ to $100$ are mixed with 20 g of 3,3'-dicyano-4,4'-diaminodiphenylmethane, 60 g of acetone and 30 g of asbestos. The resulting composition is cast into a mould, placed into a sealed cavity and cured at the temperature of 20° C. over the period of 24 hours. The final article with the dimensions of 4×4×5 cm is heat-treated for 3 hours at the temperature of 50° C. and then for 2 hours at the temperature of 120° C.

Properties of the material are shown in Tables 7 and 8.

EXAMPLES 79 TO 87

Following the procedure described in the foregoing Example 78, samples of materials are manufactured from different compositions.

The compositions' ingredients and conditions of curing thereof are shown in Table 5.

Properties of the resulting samples are shown in Tables 7 and 8 hereinbelow.

TABLE 5

| Example No. 1 | Composition ingredients Ingredient 2 | Conditions of curing of the composition | | Conditions of heat-treatment of the composition | | |
|---|---|---|---|---|---|---|
| | | amount, g 3 | temperature, °C. 4 | duration, hours 5 | temperature, °C. 6 | duration, hours |
| 79 | [structure with CH, NCO groups]₃ | 35 | 20 | 0.1 | 150 | 2.5 |
| | [structure with H₂N, NC, CN, NH₂ groups] | 17 | | | | |
| | pyridine | 50 | | | | |
| | asbestos | 10 | | | | |

TABLE 5-continued

| Example No. | Ingredient | amount, g | Conditions of curing of the composition temperature, °C. | duration, hours | Conditions of heat-treatment of the composition temperature, °C. | duration, hours |
|---|---|---|---|---|---|---|
| 1 | 2 | 3 | 4 | 5 | 6 | 7 |
| 80 | [CH₂—(C₆H₄)—NCO]₂ | 25 | 40 | 10 | 150 | 2 |
|  | NC—C₆H₂(NH₂)(CN)—NH—CH₂—NH—C₆H₂(CN)(NH₂)—ON (diamine dinitrile) | 40 |  |  |  |  |
|  | acetonitrile | 150 |  |  |  |  |
|  | mixture of chromium oxide and mica, 1:1 | 40 |  |  |  |  |
| 81 | O—[(C₆H₃)(NCO)(NCO)]₂ | 30 | 70 | 3 | 130 | 3 |
|  | P—[(C₆H₃)(NH₂)(CN)]₃ | 25 |  |  |  |  |
|  | ethylacetate | 100 |  |  |  |  |
|  | glass beads | 10 |  |  |  |  |
| 82 | O—[(C₆H₄)—NCO]₂ | 25 | 100 | 1 | 150 | 7 |
|  | NC—C₆H₃(NH₂)—[CH₂—C₆H₃(CN)(NH₂)]ₙ—CH₂—C₆H₃(CN)(NH₂), n = 1÷5 | 30 |  |  |  |  |
|  | butylacetate | 70 |  |  |  |  |
|  | asbestos | 50 |  |  |  |  |
|  | [CH—(C₆H₄)—NCO]₃ | 35 |  |  |  |  |

TABLE 5-continued

| Example No. | Ingredient | Composition ingredients amount, g | Conditions of curing of the composition temperature, °C | duration, hours | Conditions of heat-treatment of the composition temperature, °C | duration, hours |
|---|---|---|---|---|---|---|
| 1 | 2 | 3 | 4 | 5 | 6 | 7 |
| 83 | [CH₂—C₆H₃(NH₂)(CN)]₂ | 25 | 20 | 25 | 100 | — |
|  | methylene chloride | 60 |  |  |  |  |
|  | staple glass fibre | 20 |  |  |  |  |
| 84 | OCN—C₆H₄—CH₂—C₆H₃(NCO)—CH₂—C₆H₄—NCO | 25 |  |  |  |  |
|  | [2-amino-3,4-dicyano-5-thio-pyrrole] | 30 | 25 | 0.2 | 130 | 2 |
|  | graphite | 25 |  |  |  |  |
|  | pyridine | 50 |  |  |  |  |
| 85 | 2,3,5,6-tetraisocyanato pyridine | 18 |  |  |  |  |
|  | 2,5-diamino-3,4-dicyanothiophene | 15 | 50 | 0.3 | 150 | 3 |
|  | pyridine | 20 |  |  |  |  |
|  | fluoroplastic | 10 |  |  |  |  |
| 86 | OCN—C₆H₃(CH₃)—NCO | 15 |  |  |  |  |
|  | P[C₆H₃(NH₂)(CN)]₃ | 25 | 40 | 0.25 | 120 | 5 |
|  | dioxane | 50 |  |  |  |  |
|  | titanium dioxide | 30 |  |  |  |  |

TABLE 5-continued

| Example No. 1 | Composition ingredients / Ingredient 2 | Conditions of curing of the composition amount, g 3 | temperature, °C. 4 | Conditions of heat-treatment of the composition duration, hours 5 | temperature, °C. 6 | duration, hours 7 |
|---|---|---|---|---|---|---|
| 87 | $\left\{S\left[\begin{array}{c}\text{Ph-NCO} \\ \text{NCO}\end{array}\right]_2\right\}$ | 30 | 100 | 2 | 200 | 3 |
| | NC, CN substituted with H$_2$N, Se, NH$_2$ | 15 | | | | |
| | dimethylaniline | 30 | | | | |
| | glass beads | 20 | | | | |

EXAMPLE 88

Mixed are 20 g of a polyisocyanate of the structure:

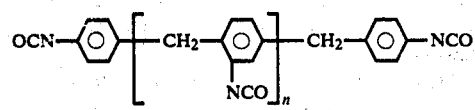

n = 1 to 10

20 g of 3,3'-dicyano-4,4'-diaminodiphenylmethane and 20 g of an epoxy resin prepared on the basis of epichlorohydrin and diphenylolpropane (the content of eposy groups is 18%). The composition is cast into a mould and cured at the temperature of 60° C. for 20 hours. The resulting sample is withdrawn from the mould and additionally cured at the temperature of 200° C. for the period of 5 hours.

EXAMPLE 89

Following the procedure described in the foregoing Example 88, there are produced samples of the heat-resistant material from different compositions.

The compositions' ingredients and conditions of curing thereof are shown in Table 6.

Properties of the thus-manufactured samples are shown in Tables 7 and 8 hereinbelow.

TABLE 6

| Example No. 1 | Composition ingredients / Ingredient 2 | Conditions of curing of the composition amount, g 3 | temperature, °C., 4 | Heat-treatment conditions duration, hours 5 | temperature, °C. 6 | duration, hours 7 |
|---|---|---|---|---|---|---|
| 89 | OCN-Ph-C(-O-)(B$_{10}$H$_{10}$)-C-Ph-NCO (with OCN and NCO substituents) | 40 | 150 | 0.5 | 200 | 0.3 |
| | NC, CN pyrrole with H$_2$N, NH$_2$, NH$_2$ | 20 | | | | |
| | silicone resin of the formula* | 20 | | | | |
| | molybdenum bisulphide | 30 | | | | |
| | HO-[Si(Ph)(Ph)-O-]$_n$-Si(Ph)(Ph)-ON, n = 5 ÷ 10 | | | | | |

TABLE 7

| Example No. | Time of thermal ageing in air at 250° C., hours | Weight losses, % |
|---|---|---|
| 78 | 300 | 3 |
| 79 | 100 | 1 |
| 80 | 500 | 2.5 |
| 81 | 500 | 5 |
| 82 | 100 | 0.5 |
| 83 | 500 | 1 |
| 84 | 500 | 2 |
| 85 | 100 | 1 |
| 86 | 100 | 0.6 |
| 87 | 500 | 3 |
| 88 | 500 | 0.2 |
| 89 | 100 | 0.1 |

TABLE 8

| Example No. | Test temperature, °C. | Compression strength, σ comp. kg/cm² |
|---|---|---|
| 78 | 20 | 1,000 |
| 79 | 20 | 800 |
| 80 | 20 | 900 |
| 81 | 20 | 900 |
|    | 300 | 490 |
| 82 | 20 | 800 |
| 83 | 20 | 800 |
| 84 | 20 | 950 |
| 85 | 20 | 1,000 |
| 86 | 20 | 900 |
|    | 300 | 600 |
| 87 | 20 | 1,000 |
| 88 | 20 | 1,200 |
| 89 | 20 | 1,900 |
|    | 300 | 900 |

What is claimed is:

1. A heat-resistant composition containing a filler, a binder and a compund in a ratio of 0.1-10,000 parts filler to 100 parts binder to 1-99 parts compound, said binder being an organic or an elemento-organic compound of the formula:

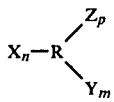

wherein R is an organic radical selected from the group consisting of radicals having from 2 to 1,000 carbon atoms; a radical selected from the group consisting of radicals having from 2 to 1,000 carbon atoms, said radical containing at least one of the elements silicon, fluorine, chlorine, bromine, nitrogen, sulphur, phosphorus, boron or oxygen, each of said elements being present in an amount of from 1 to 1,000 atoms;

X and Y are each a radical selected from the group consisting of —NH$_2$, —OH, —SH, —NCO, —NSO, —NCS;

Z is a radical selected from the group consisting of —C≡N, —C≡H, Z being in alpha-, beta-, ortho-, or peri- position relative to X; Z being located in alpha-, beta-, ortho-, or peri- position relative to Y;

$n \geq 1$; $m \geq 1$; $p \geq 1$, and said compound being of the formula: R—P$_q$, wherein R is an organic radical selected from the group consisting of radicals with a number of carbon atoms of from 2 to 1,000; and radicals selected from the group consisting of radicals with a number of carbon atoms of from 2 to 1,000, said radical containing at least one of the elements silicon, fluorine, chlorine, bromine, nitrogen, sulphur, phosphurous, boron or oxygen, each of said elements being present in an amount of from 1 to 1,000 atoms;

wherein P is a radical selected from the group consisting of

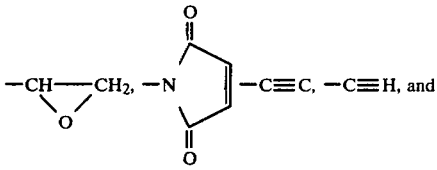

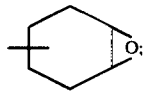

and wherein $q \geq 1$.

2. A heat-resistant composition as claimed in claim 1, including 8 to 180 parts by weight of at least one compound selected from the group consisting of polybenzoxazole, polyimide, polyphenylquinoxaline, polyphenylenesulphide, polybenzimidazole, polyoxadiazole, polytriazine.

3. Heat resistant composition according to claim 2 wherein said filler, binder and compound are in a ratio of 0.1-2,500 parts filler to 100 parts binder to 1-99 parts compound.

4. Heat resistant composition according to claim 1 wherein said binder is 2,5-diamino-3,4-dicyanothiophene.

5. Heat resistant composition according to claim 1 wherein the filler, binder and compound are in a ratio of 0.1-2,500 parts filler to 100 parts binder to 1-99 parts compound.

6. A heat-resistant composition containing a filler, a binder and a substance in a ratio of 0.1-10,000 parts filler to 100 parts binder to 8-180 parts substance, said binder being an organic or an elemento-organic compound of the formula:

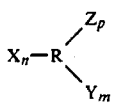

wherein
R is an organic radical selected from the group consisting of radicals having from 2 to 1,000 carbon atoms; a radical selected from the group consisting of radicals having from 2 to 1,000 carbon atoms, said radical containing at least one of the elements silicon, fluorine, chlorine, bromine, nitrogen, sulphur, phosphorus, boron or oxygen, each of said elements being present in an amount of from 1 to 1,000 atoms;

X and Y are each a radical selected from the group consisting of —NH$_2$, —OH, —SH, —NCO, —NSO, —NCS;

Z is a radical selected from the group consisting of —C≡N, —C≡CH, Z being in alpha-, beta-, ortho-, or peri- position relative to X; Z being located in alpha-, beta-, ortho-, or peri- position relative to Y;

$n \geqq 1; m \geqq 1; p \geqq 1,$ and wherein said substance is selected from the group consisting of polybenzoxazole, polyimide, polyphenylquinoxaline, polyphenylenesulphide, polybenzimidazole, polyoxadiazole and polytriazine.

7. Heat resistant composition according to claim 6 wherein said filler, binder and substance are in a ratio of 0.1–2,500 parts filler of 100 parts binder to 80–180 parts substance.

* * * * *